United States Patent
Nomura et al.

(10) Patent No.: US 10,007,998 B2
(45) Date of Patent: Jun. 26, 2018

(54) IMAGE PROCESSOR, APPARATUS, AND CONTROL SYSTEM FOR CORRECTION OF STEREO IMAGES

(71) Applicants: Yasuhiro Nomura, Yokohama (JP); Kenji Shiraishi, Kanagawa (JP); Morihiro Takagi, Kanagawa (JP); Kei Itoh, Kanagawa (JP)

(72) Inventors: Yasuhiro Nomura, Yokohama (JP); Kenji Shiraishi, Kanagawa (JP); Morihiro Takagi, Kanagawa (JP); Kei Itoh, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 20 days.

(21) Appl. No.: 15/073,157

(22) Filed: Mar. 17, 2016

(65) Prior Publication Data

US 2016/0275694 A1    Sep. 22, 2016

(30) Foreign Application Priority Data

Mar. 20, 2015 (JP) .................. 2015-057162
Dec. 18, 2015 (JP) .................. 2015-247129

(51) Int. Cl.
G06K 9/00  (2006.01)
G06T 7/20  (2017.01)
(Continued)

(52) U.S. Cl.
CPC ............ *G06T 7/20* (2013.01); *G06K 9/00805* (2013.01); *G06K 9/32* (2013.01); *G06K 9/6215* (2013.01);
(Continued)

(58) Field of Classification Search
CPC ........ G01B 11/026; G01C 3/085; G01C 3/14; G06T 2207/30252; G06T 7/593; G06T 7/85; G08G 1/16
See application file for complete search history.

(56) References Cited

U.S. PATENT DOCUMENTS 6,385,334 B1    5/2002   Saneyoshi et al.
6,985,619 B1    1/2006   Seta et al.
(Continued)

FOREIGN PATENT DOCUMENTS

EP    1 087 626 A2    3/2001
JP    58-201018 A    11/1983
(Continued)

OTHER PUBLICATIONS

Extended European Search Report dated Aug. 23, 2016 in Patent Application No. 16161122.3.
(Continued)

*Primary Examiner* — Siamak Harandi
(74) *Attorney, Agent, or Firm* — Oblon, McClelland, Maier & Neustadt, L.L.P.

(57) ABSTRACT

An image processor includes a corrector that corrects deviation of a coordinate in an image photographed by a photographing unit based on a correction parameter stored in a memory; and an updater that generates the correction parameter based on the image photographed by the photographing unit, and updates the correction parameter stored in the memory, the updater updating the correction parameter according to a process condition based on the image corrected by the corrector.

11 Claims, 7 Drawing Sheets

(51) Int. Cl.
*G06K 9/32* (2006.01)
*G06K 9/62* (2006.01)
*H04N 13/02* (2006.01)
*G06T 7/80* (2017.01)

(52) U.S. Cl.
CPC ............ *G06T 7/85* (2017.01); *H04N 13/0203* (2013.01); *G06T 2207/10021* (2013.01); *G06T 2207/30252* (2013.01); *G06T 2207/30261* (2013.01)

(56) References Cited

U.S. PATENT DOCUMENTS

| | | |
|---|---|---|
| 2012/0113278 A1 | 5/2012 | Okada |
| 2012/0224069 A1* | 9/2012 | Aoki .................... G01B 11/026 348/187 |
| 2012/0236124 A1 | 9/2012 | Aoki |
| 2012/0236125 A1 | 9/2012 | Umezawa et al. |
| 2013/0250065 A1 | 9/2013 | Aoki et al. |
| 2013/0250068 A1 | 9/2013 | Aoki |
| 2015/0073705 A1* | 3/2015 | Hiwatashi ............... G01S 19/48 701/468 |

FOREIGN PATENT DOCUMENTS

| | | |
|---|---|---|
| JP | 10-341458 | 12/1998 |
| JP | 4172554 | 8/2008 |
| JP | 2012-103741 | 5/2010 |
| JP | 4573977 | 8/2010 |
| JP | 2012-58188 | 3/2012 |
| JP | 2014-127776 | 7/2014 |
| JP | 2014-138331 | 7/2014 |
| JP | 2014-138332 | 7/2014 |
| WO | WO 2012/035983 A1 | 3/2012 |

OTHER PUBLICATIONS

J. Arrospide, et al. "Homography-based ground plane detection using a single on-board camera" IET Intelligent Transport Systems, 2010, XP006035036, vol. 4, Iss. 2, pp. 149-160.

* cited by examiner

IMAGE PROCESSOR, APPARATUS, AND CONTROL SYSTEM FOR CORRECTION OF STEREO IMAGES

CROSS-REFERENCE TO RELATED APPLICATION

The present application is based on and claims priority to Japanese patent application No. 2015-057162, filed Mar. 20, 2015, and Japanese patent application No. 2015-247129, filed Dec. 18, 2015, the disclosure of which is hereby incorporated by reference herein in its entirety.

BACKGROUND

Technical Field

The present invention relates to an image processor, photographing device, program, apparatus control system, and apparatus.

Description of Related Art

A stereo camera as a photographing device including two photographing units generates information for calculating a distance to a specific object such as an obstacle that is included in a subject. When such a stereo camera is mounted on a vehicle to work with a vehicle control system, the stereo camera detects an obstacle included in a subject located in front of a vehicle to be used for an avoidance operation in a vehicle.

The stereo camera simultaneously photographs the same subject by the two photographing units to generate the information for use in the calculation of the distance to the specific object based on a difference between subject images in the respective photographed images. When the stereo camera works with the vehicle control system, the stereo camera repeats the photographing and the generation of the information at predetermined intervals, and generates as a moving image a parallax image including the information regarding the distance to the specific object included in the subject in the photographed image. The vehicle control system detects a traffic lane or an obstacle with the parallax image to be used for avoidance control, for example.

In order to accurately measure a distance by the stereo camera, it is necessary to know relative positions of components of each photographing unit such as a photographing lens and an imaging element. However, minute deformation of the photographing device caused by temporal changes, temperature features, and the like is unavoidable. It is therefore a photographing device using an automatic calibration technique, which corrects deviation of a coordinate of a photographed image, in parallel with periodical operations has been known (for example, refer to Patent Literature 1, Japanese Laid Open Patent No. 2014-138331).

The photographing device described in Patent Literature 1 updates a coefficient of a correction equation for correcting the deviation of the coordinate multiple times, so as to avoid false recognition of an obstacle in a vehicle control system using a corrected photographed image even when the correction amount of the deviation of the coordinate of the photographed image is large. However, it is necessary to further improve the calculation accuracy of the distance to the obstacle.

For example, the false recognition of the obstacle occurs when timing of using the corrected photographed image by the vehicle control system coincides with timing of updating the coefficient of the correction formula.

SUMMARY

It is therefore an object of the present invention to provide an image processor that corrects deviation of a coordinate in a photographed image at appropriate timing.

To achieve the above object, an aspect of the present invention provides an image processor including a corrector that corrects deviation of a coordinate in an image photographed by a photographing unit based on a correction parameter stored in a memory; and an updater that generates the correction parameter based on the image photographed by the photographing unit, and updates the correction parameter stored in the memory, the updater updating the correction parameter according to a process condition based on the image corrected by the corrector.

DETAILED DESCRIPTION

Figure 1:
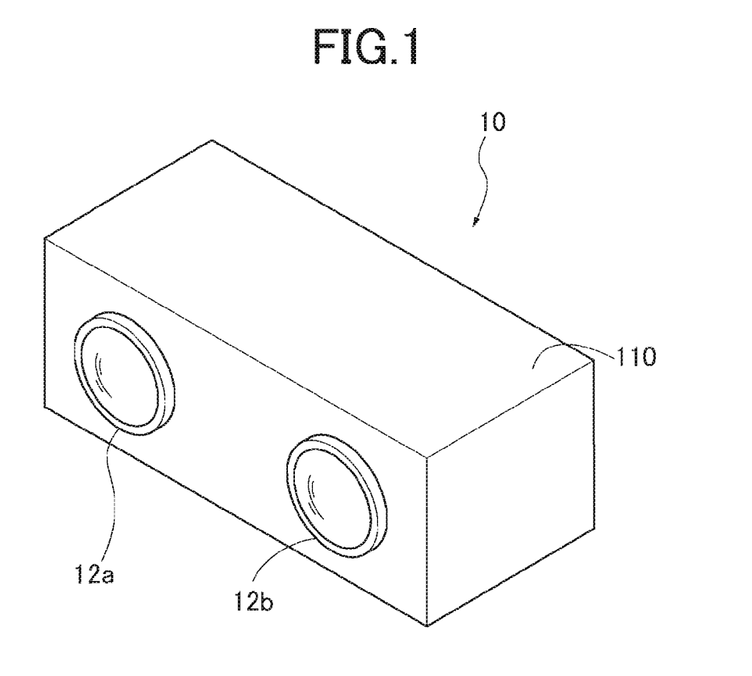
FIG. 1 is a perspective view illustrating a stereo camera according to an embodiment of the present invention.
Figure 2:
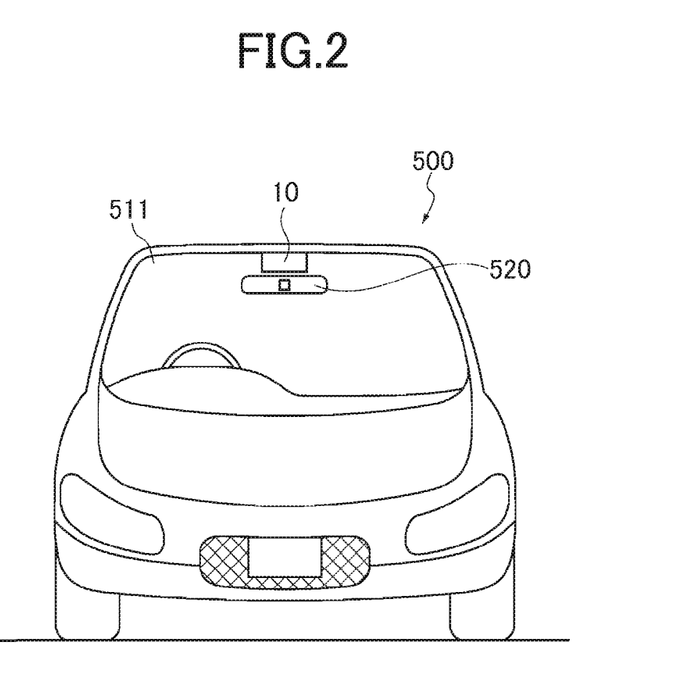
FIG. 2 is a front view illustrating an example of a vehicle according to the embodiment of the present invention.

Hereinafter, an embodiment of the present invention will be described with reference to the drawings. The embodiment of the present invention will be described with reference to a stereo camera 10 as a photographing device and a vehicle 500 including the stereo camera 10. The stereo camera 10 as shown in FIG. 1 includes a pair of photographing lenses 12a and 12b that expose outside from a casing 110. The stereo camera 10 is mounted on an upper portion of an inside (vehicle interior side) of a windshield 511 of the vehicle 500, as illustrated in FIG. 2. More specifically, the stereo camera 10 is located near an inner rear view mirror 520 of the vehicle 500, as illustrated in FIG. 2. The location of the stereo camera 10 is not limited as described above as long as the stereo camera 10 is located to obtain information for recognizing a condition in front of the vehicle 500 in the traveling direction. In this embodiment, the width direction (right and left direction of the figure) of the vehicle 500 is referred to as a vehicle width direction, and the direction orthogonal to the vehicle width direction is referred to as a vehicle traveling direction.

The stereo camera 10 is mounted on an apparatus in which a distance to a measurement target changes. The apparatus on which the stereo camera 10 is mounted is not limited to the vehicle 500 as the present embodiment. The stereo camera 10 can be mounted on a movable body such as a ship and a train. The stereo camera 10 can be also used for Factory Automation (FA). In this case, the stereo camera 10 is mounted on a fixed body such as a building. The stereo camera 10 obtains (obtains distance information) a distance to a subject as a measurement target from mage data including a subject, which is photographed as described below. The measurement target of the stereo camera 10 is another movable body such as a person and an animal.

Next, a vehicle control system 300 as an embodiment of an apparatus control system will be described. The stereo camera 10 is located to photograph the traveling direction of the vehicle 500. The photographing lenses 12a and 12b therefore face a predetermined direction. The vehicle control system 300 photographs an object (recognition target) in the traveling direction of the vehicle 500 in cooperation with the stereo camera 10.

The vehicle control system 300 includes the stereo camera 10, a controller 301, steering wheel 302, and brake pedal 303.

Figure 4:
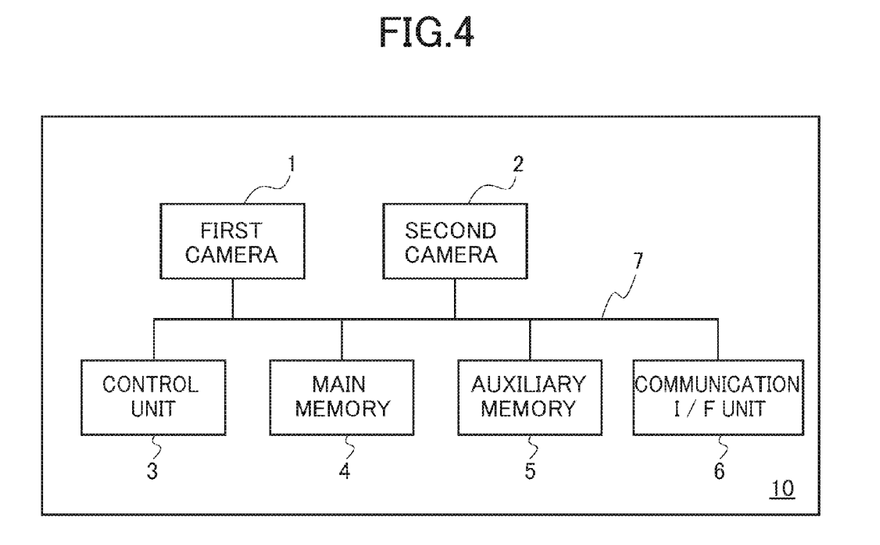
FIG. 4 is a block diagram illustrating an example of hardware of a stereo camera.

The stereo camera 10 includes two cameras of a first camera 1 and a second camera 2, as illustrated in FIG. 4. The first camera 1 is, for example, a single camera including a photographing element corresponding to the photographing lens 12a. The second camera 2 is, for example, a single camera including a photographing element corresponding to the photographing lens 12b. The stereo camera 10 includes a control unit 3, main memory 4, auxiliary memory 5, and communication I/F unit 6. The first camera 1, second camera 2, control unit 3, main memory 4, auxiliary memory 5, and communication I/F unit 6 are connected through a bus 7.

The relationship between the stereo camera 10 and the vehicle control system 300 will be hereinafter described. The controller 301 of the vehicle control system 300 illustrated in FIG. 3 executes various controls of the vehicle 500 according to the information calculated based on a parallax image 115 received from the stereo camera 10. In addition, the parallax image 115 will be described later.

Figure 3:
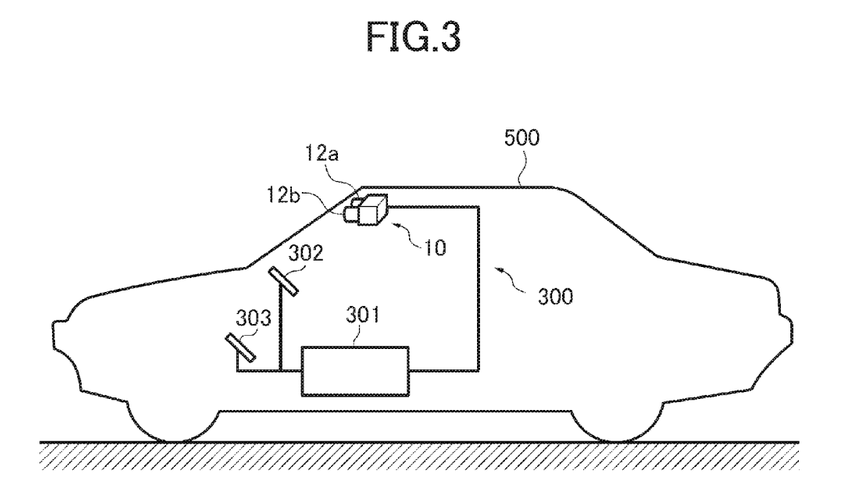
FIG. 3 is an entire view illustrating an example of a vehicle control system according to the embodiment of the present invention.

The controller 301 operates a steering system (control target) including the steering wheel 302 according to a distance to an object calculated based on the parallax image 115 received from the stereo camera 10. With this steering control, the controller 301 operates the vehicle 500 to avoid the object (obstacle) in the traveling direction of the vehicle 500. The controller 301 also operates a brake system (control target) including the brake pedal 303 according to a distance to the object calculated based on the parallax image 115 received from the stereo camera 10. The controller 301 automatically decreases the speed of the vehicle 500 and stops the vehicle 500. As described above, the vehicle control system 300 executes the steering control and the brake control of the vehicle 500 based on the parallax image 115 received from the stereo camera 10. The driving safety of the vehicle 500 can be therefore improved.

In the above description, the photographing target of the stereo camera 10 is located in front of the vehicle 500. However, the photographing target is not limited thereto. Namely, the stereo camera 10 may be located to photograph the rear and the side of the vehicle 500. In this case, the stereo camera 10 can detect a distance to a following vehicle behind the vehicle 500 and a distance to another vehicle traveling on the side of the vehicle 500. The controller 301 detects a danger in lane change or in junction of lanes of the vehicle 500 to execute the above control.

The controller 301 executes the above control when determining a danger of collision based on the parallax image 115 of the obstacle in the rear of the vehicle 500, which is detected by the stereo camera 10, in a reversing operation when parking the vehicle 500.

Referring to FIG. 4, the control unit 3 is a CPU that executes a program read from the auxiliary memory 5 by the main memory 4. The main memory 4 is a memory including a ROM as a non-volatile memory and a RAM as a volatile memory. The auxiliary memory 5 is a memory card. The communication I/F unit 6 is an interface that communicates with another apparatus through a network.

The program executed in the stereo camera 10 is previously incorporated in the ROM in the main memory 4. The details of the program will be described later.

In addition, the program may be a program in addition to the above program that is previously incorporated in the main memory 4. For example, the program may be a computer program product that is installed later in the stereo camera 10 and is recorded in a computer readable recording medium. The recording medium that can be read by a computer is, for example, a CD-ROM, memory card, CD-R, and DVD.

The program may be stored in a computer connected to a network such as the Internet, and downloaded in the stereo camera 10 through the network to be installed.

In the stereo camera 10, the later described respective functions are executed by reading the program from the ROM by the control unit 3.

A part or the entire of the respective functions may be executed by hardware such as an IC without executing by software. The stereo camera 10 of the present embodiment includes the two cameras. However, the number of photographing units is not limited two. The photographing unit of the present embodiment is achieved as long as one or more photographing unit is used. The similar configuration can be applied to a monocular camera including one photographing unit.

Figure 5:
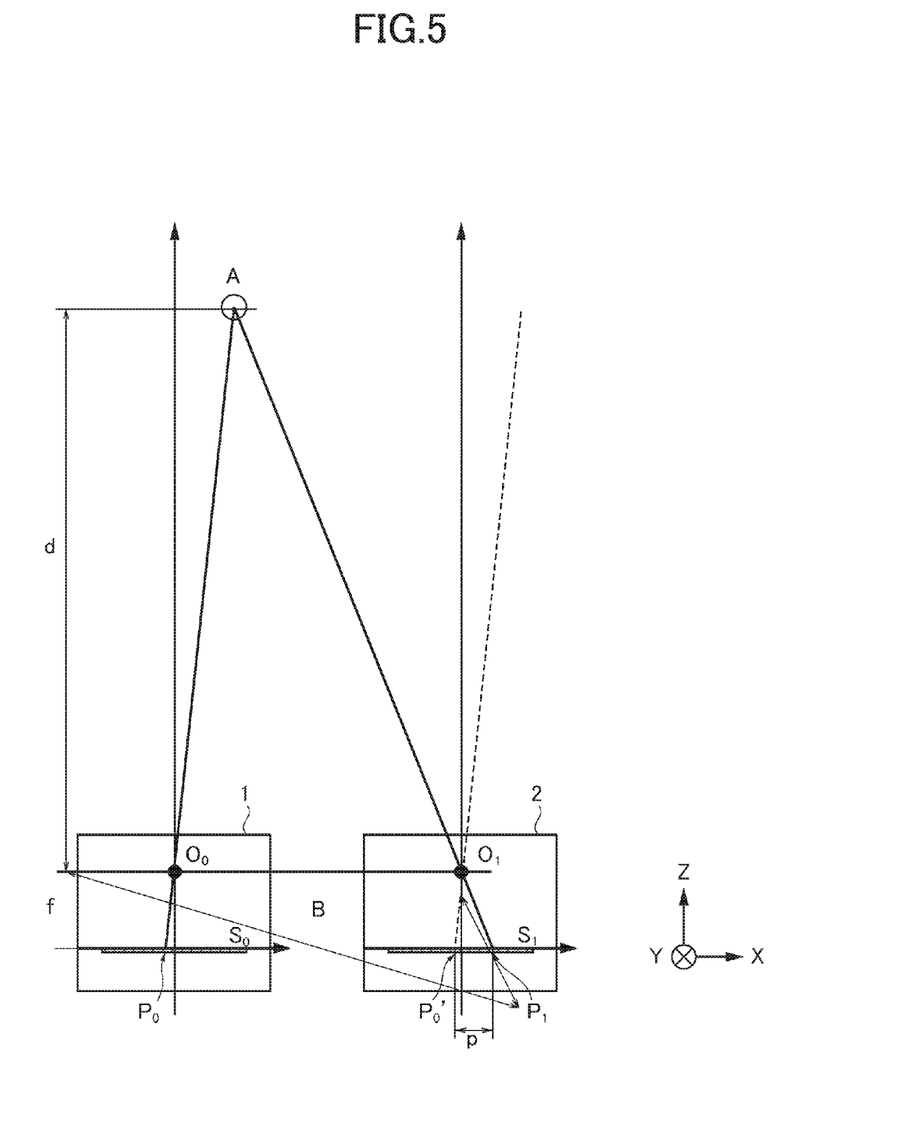
FIG. 5 is a view describing a principle of measuring a distance with the stereo camera.

A principle for measuring a distance by using the stereo camera 10 will be hereinafter described. FIG. 5 is a view illustrating a relationship between the arrangement of the first and second cameras 1 and 2 of the stereo camera 10 and the subject A photographed by the first and second cameras 1 and 2. In FIG. 5, the arrangement direction of the first and second cameras 1 and 2 is referred to as an X-axis direction, the direction orthogonal to the X-axis direction and the direction of the subject A, namely, the optical axis direction of the first and second cameras 1 and 2 is referred to as a Z-axis direction, and the direction orthogonal to the X and Z axes directions is referred to as a Y-axis direction.

Referring to FIG. 5, f represents a focal length of the first camera 1, $O_0$ represents an optical center, and $S_0$ represents a photographing plane on which the image of the subject A is imaged in the photographing element of the first camera 1. Similarly, f represents a focal length of the second camera 2, $O_1$ represents an optical center, and $S_1$ represents a photographing plane on which the image of the subject A is imaged in the imaging element of the second camera 2. The photographing plane $S_0$ and the photographing plane S face the Z-axis direction and are orthogonal to the optical axis direction of the first and second cameras 1 and 2. The first and second cameras 1 and 2 are separated at a reference line length B in the X-axis direction.

The image of the subject A separated from the optical center $O_0$ of the first camera 1 at a distance d in the Z-axis direction is formed in the position $P_0$ that is the intersection of the straight line A-$O_0$ and the photographing plane $S_0$. On the other hand, the image of the same subject A is formed in the position $P_1$ in the photographing plane S of the second camera 2.

The intersection of the photographing plane $S_1$ and the straight line parallel to the straight line $A$-$O_0$ which is a straight line passing through the optical center $O_1$ of the second camera 2 is represented as a position $P_{0'}$. The difference between the position $P_{0'}$ and the position $P_1$ is represented as a parallax p. The parallax p corresponds to the gap of the imaging position of the subject A in the respective images when photographing the same subject A with the first and second cameras 1 and 2. Hereinafter, the gap of the imaging position is represented as the parallax p.

As illustrated in FIG. 5, a triangle $A$-$O_0$-$O_1$ and a triangle $O_1$-$P_{0'}$-$P_1$ defined by the above conditions are similar shapes. The distance d to the subject A is thereby obtained by the formula B×f/p. As described above, the distance d to the subject A can be calculated by using the stereo camera 10 based on the reference line length B as the interval between the first and second cameras 1 and 2, the focal length f of each camera, and the parallax p which is the gap of the imaging position of the subject A.

Figure 6:
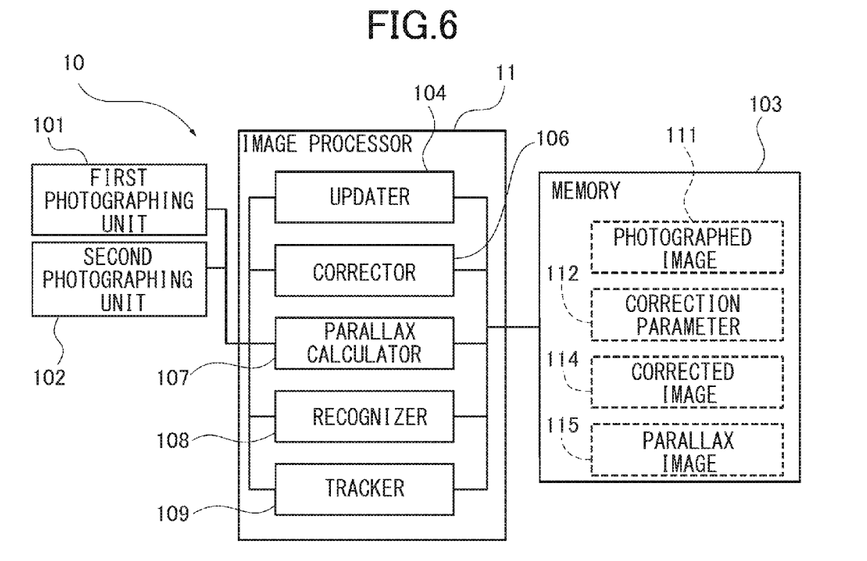
FIG. 6 is a block diagram illustrating an example of an image processor and a stereo camera according to the embodiment of the present invention.

Next, an image processor 11 of the stereo camera 10 according to the embodiment of the present invention will be described. The stereo camera 10 as shown in FIG. 6 includes a first photographing unit 101, second photographing unit 102, the image processor 11, and a memory 103. FIG. 6 is a block diagram showing the stereo camera 10. The image processor 11 is achieved by the program that is executed by using a hardware source (refer to FIG. 4) of the stereo camera 10.

The image processor 11 of the stereo camera 10 includes an updater 104, corrector 106, parallax calculator 107, recognizer 108, and tracker 109. The respective functional blocks of the image processor 11 are achieved by the program that is executed by using the hardware source (refer to FIG. 4) of the stereo camera 10. The parallax calculator 107, recognizer 108, and tracker 109 may be separated from the image processor 11 to be executed by another hardware which is different from the stereo camera 10.

The recognizer 108 executes a recognition process that recognizes an object in an image obtained by the first and second photographing units 101 and 102. A known process method with template matching and Hog feature amount can be used.

The tracker 109 executes a tracking process of specifying in the present frame the object recognized in the previous frame in the image obtained by the first and second photographing units 101 and 102. A known process method with an optical flow can be used as the tracking process.

The first photographing unit 101 controls the photographing operation of the first camera and executes a process of generating a first photographed image based on the signal output from the photographing element of the first camera 1. The second photographing unit 102 controls the photographing operation of the second camera 2 and executes a process of generating a second photographed image based on the signal output from the photographing element of the second camera 2. The first and second cameras 1 and 2 photograph in synchronization with the first and second photographing units 101 and 102. The first and second photographed images are thereby obtained by simultaneously photographing the same direction.

The first and second photographed images are stored in the RAM included in the main memory 4 by the memory 103 as the photographed images 111. In the following description, the first and second photographed images are simply referred to as the photographed image 111 when the first and second photographed images are not discriminated.

The memory 103 executes a process of storing information from the first and second photographing units 101 and 102, updater 104, corrector 106, and parallax calculator 107 in the RAM or the ROM in the main memory 4. The memory 103 executes a process of reading the information stored in the RAM or the ROM. The information stored in the RAM or the ROM by the memory 103 includes the photographed image 111, a correction parameter 112, a corrected image 114, and the parallax image 115, as shown in FIG. 6.

The updater 104 reads the photographed image 111 stored in the RAM or the ROM. The updater 104 executes a process of generating the correction parameter 112 based on the photographed image 111. The updater 104 stores the generated correction parameter 112 in the RAM or the ROM.

The correction parameter 112 is a parameter for correcting the deviation of the coordinate of the first and second photographed images caused by the temporal position gap of the first and second cameras 1 and 2. The updater 104 regularly generates the correction parameter 112. The generated correction parameter 112 is stored in the RAM or the ROM by the updater 104. When the correction parameter 112 is generated, if the correction parameter 112 is already stored in the RAM, the updater 104 overwrites the old correction parameter 112 by using the correction parameter 112 newly generated by the updater 104. This overwriting process is referred to as the updating of the correction parameter 112.

In addition, before executing the updating process of the correction parameter 112, when the newly generated correction parameter 112 is once written in the ROM to be stored, the latest correction parameter 112 can be protected even though the power source of the stereo camera 10 is turned off before the updating process. In this case, if the correction parameter 112 is stored in the ROM when the power source of the stereo camera 10 is turned on, the RAM is initialized by using the latest correction parameter 112.

A method of updating the correction parameter 112 is appropriately selected from various methods. The correction parameter 112 may be updated by approximation with the method of least squares, for example, from a pair of coordinates.

The corrector 106 reads the correction parameter 112 from the RAM by the memory 103, and executes the correction process to the photographed image 111 with the correction parameter 112. The corrected image 114 is thus generated from the photographed image 111 by the correction process. The generated corrected image 114 is stored in the RAM by the memory 103.

The correction process that is executed in the corrector 106 will be described below. The photographed image 111 stored in the RAM is the first photographed image and the second photographed image as described above. The correction parameter 112 is a correction coefficient for use in the correction equation for correcting the deviation of the coordinate of the first and second photographed images caused by the temporal position gap of the first and second cameras 1 and 2. For example, the correction equation using the correction parameter 112 is as the following equations.

$$x'=a_0+a_1x+a_2y+a_3x^2a_4xy+a_5y^2$$

$$y'=b_0b_1x+b_2y+b_3x^2b_4xy+b_5y^2$$

In the above correction equations, x and y are coordinates before conversion, and x' and y' are coordinates after conversion. The correction parameter 112 is $a_0$ to $a_5$ and $b_0$ to $b_5$. Namely, these $a_0$ to $a_5$ and $b_0$ to $b_5$ are stored in the RAM by the memory 103.

In the above correction equations, the correction process may be executed with the coordinate of the corrected image 114 that is an image after the correction as x and y and the coordinate of the photographed image 111 that is an image before the correction as x' and y'. Namely, in the correction process using the above correction equation, the coordinate after the conversion may be used as a standard or the coordinate before the conversion may be also used as a standard. The correction parameter 112 is not limited to the coefficient of the polynomial as described above, and may be a lookup table. For example, the corrected value (pixel gap amount in x direction and pixel gap amount in y direction) may be stored with respect to the pixel or the pixel group, and the values may be used as the correction parameter 112. However, it is preferable to use the polynomial since the amount of the correction parameter 112 to be stored can be reduced.

As described above, the corrected image 114 stored in the RAM of the main memory 4 by the memory 103 is obtained by executing the correction process using the above equations and the correction parameter 112 to the photographed image 111 by the corrector 106.

Figure 7:
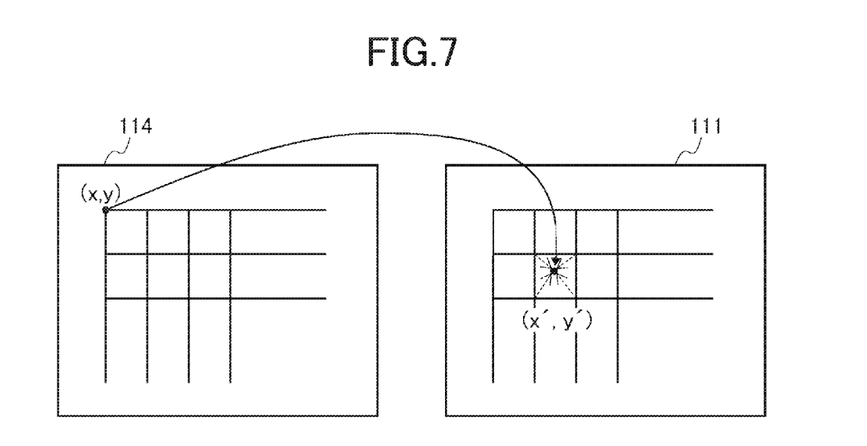
FIG. 7 is a view schematically illustrating an example of correcting deviation of a coordinate of a photographed image that is executed in a photographing device.

The correction of the deviation of the coordinate of the photographed image 111, which is executed by the corrector 106, will be described below with reference to FIG. 7. The correction of the deviation of the coordinate, which is executed by the corrector 106, is a coordinate conversion process. The corrector 106 executes a process of converting the coordinate of the corrected image 114 which is an image after the correction and the coordinate of the photographed image 111 which is an image before the correction by using the above-described correction equations and the correction parameter 112.

The pixel value of the corresponding photographed image 111 is referred by the correction equations to determine the pixel value of the corrected image 114. In this case, the value of the coordinate after the conversion may not be an integral number. The corrector 106 executes a pixel value interpolation process of interpolating the pixel value of the coordinate which does not have an integral value from the pixel value of the circumference of the photographed image 111, as illustrated by the dotted line in FIG. 7.

The corrector 106 executes the pixel value interpolation process through bilinear interpolation. The corrector 106 executes the coordinate conversion with the above correction equations and the pixel value interpolation process for all of the pixels to generate the corrected image 114 through the geometric correction of the photographed image 111.

The parallax calculator 107 executes the process of calculating the parallax p based on the above-described measuring principle by using the corrected image 114 which is the corrected photographed image 111. The parallax calculator 107 generates the parallax image 115 including the parallax information of the coordinate of the photographed image 111 with the parallax p. The generated parallax image 115 is stored in the RAM by the memory 103.

A method of calculating parallax in the parallax calculator 107 is the same as the method of calculating parallax in a known parallel equal-positioned stereo camera. For example, when the first photographed image is used as the standard image, the image area around a feature point extracted from the first photographed image and the image area on the second photographed image as an image of a comparative target are shifted by 1 pixel to calculate the value that is the correlation index of both of the image areas. The value that is the correlation index is a value obtained by comparing the sum of the brightness values of the pixels in both of the image areas. Moreover, Sum of Absolute Difference (SAD) and Normalized Cross Correlation (NCC) can be used as the value that is the correlation index. The parallax p is calculated with the accuracy of the pixel or below by complementing the value close to the maximum value of the calculated values with a parabola, for example.

Since the reliability of the parallax p of 1 pixel or less is deteriorated, the parallax calculator 107 rounds out the parallax p of 1 pixel or less to 1 pixel. Namely, the minimum parallax pixel in the stereo camera 10 is 1 pixel.

In the stereo camera 10, the process of each section in the program is periodically executed. The photographing of the photographed image 111, the calculation and updating of the correction parameter 112, the generation and storing of the parallax image 115, and the generation and storing of the parallax image 115 are therefore periodically repeated. Namely, in the stereo camera 10, the parallax image 115 is repeatedly generated, and is stored in the RAM of the main memory 4.

As described above, the stereo camera 10 executes the updating process of the correction parameter 112 from the photographing process of the photographed image 111, and then periodically executes the process of generating the parallax image 115.

Hereinafter, the false recognition in the vehicle control system 300 which occurs when the correction parameter 112 is updated while the vehicle control system 300 recognizes and tracks the obstacle will be described. When the parallax image 115 is generated based on the updated correction parameter 112, the recognition results of the obstacle may differ in the vehicle control system 300 although the parallax image 115 is based on the same photographed image 111.

If the parallax p of the obstacle is 1 pixel in the parallax image 115 generated when the stereo camera 10 photographs the obstacle at an actual distance of 100 m from the vehicle 500 and the error of the parallax p to the photographed image 111 including the obstacle is −0.5 pixel in the stereo camera 10, when the parallax image 115 is generated based on the photographed image 111 obtained in a certain frame by using the stereo camera 10, the parallax p regarding the above obstacle becomes 0.5 pixel, which should be 1 pixel, due to the error. In the recognition process of the vehicle control system 300 based on this result, the distance corresponding to 0.5 pixel is recognized, so that the distance to the obstacle is recognized as 200 in.

While the vehicle control system 300 executes the process of recognizing and tracking the obstacle, the correction parameter 112 may be updated at the next frame in the stereo camera 10. In this case, the parallax image 115 is generated based on the corrected image 114 in which the above-described error of the parallax is corrected. In this case, with the no error of −0.5 pixel, the parallax p regarding the obstacle in this frame is 1 pixel. More specifically, the vehicle control system 300 recognizes the obstacle at 100 m in this frame, which is recognized at 200 m in the previous frame. If the vehicle control system 300 calculates the distance of the obstacle in the next frame from these results, the distance is calculated as 0 m. The vehicle control system 300 therefore anticipates collision to the obstacle, and executes emergency braking to avoid the obstacle.

The standard vehicle control system 300 includes a margin that determines a collision multiple times until the above control is started. Namely, when the possibility of the collision is determined over the several frames, the steering control and the brake control are executed to the vehicle 500 to secure the stability of the vehicle control. The unnecessary control does not always occur in the above situation. However, it is preferable for the stereo camera 10 to have high reliability.

The deviation of the coordinate is immediately corrected when the correction process is effectively executed in the stereo camera 10. For this reason, the parallax error as described above does not occur in many cases. However, a certain level of the deviation of the coordinate may be measured at once after the activation of the stereo camera 10, when updating the first automatic calibration, and when the property of the camera is significantly changed in a short time. If the corrector 106 corrects such deviation of the coordinate, the distance of the measurement result may be significantly changed.

For example, when the vehicle 500 is moved from shadow to the sun, and when a temperature is changed due to the activation of a heating and cooling system of the vehicle 500, the property of the stereo camera 10 is significantly changed in a short time. In this embodiment, while the vehicle 500 travels, the automatic calibration is executed to address the temporal change and the temperature change. The automatic calibration may be various known methods described in for example Japanese Laid-Open Patent No. H10-341458.

Figure 8:
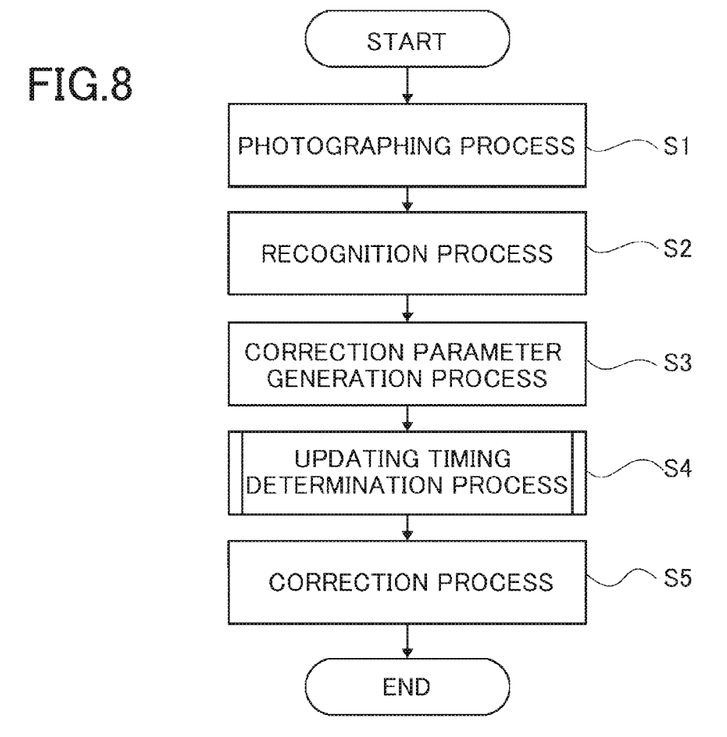
FIG. 8 is a flowchart illustrating an example of flow of a program process that executes each function of the photographing device.

Next, the flow of the process of the program that is executed in the stereo camera 10 according to the embodiment of the present invention will be described with reference to the flowchart in FIG. 8. In addition, the respective steps are referred to as S1, S2, S3, and the like.

The photographing process of obtaining the first photographed image and the second photographed image as the photographed image 111 is executed by the first and second photographing units 101 and 102 (S1). Next, the recognizer 108 executes the recognition process of recognizing an object in the photographed image 111 based on the photographed image 111 obtained by the photographing process (S1) (S2). When the object is recognized by the recognition process (S2), a recognition flag R is on relative to the pixel group corresponding to the object in the photographed image 111. In this case, when the recognition flag R is on, the value of the recognition flag R is set to 1. In the following process, the pixel group having the recognition flag R of 1 is a target of the tracking process by the tracker 109. In this embodiment, when the photographed image 111 includes the pixel group to which the recognition flag R is on, the tracker 109 is under the tracking condition.

The updater 104 executes the process of generating the correction parameter 112 which is the coefficient for correcting the deviation of the coordinate caused by temporal position gap in the first and second cameras 1 and 2 (S3). Next, when updating the previously generated correction parameter 112 based on the newly generated correction parameter 112, the updater 104 executes an updating timing determination process of determining updating timing (S4).

Figure 9:
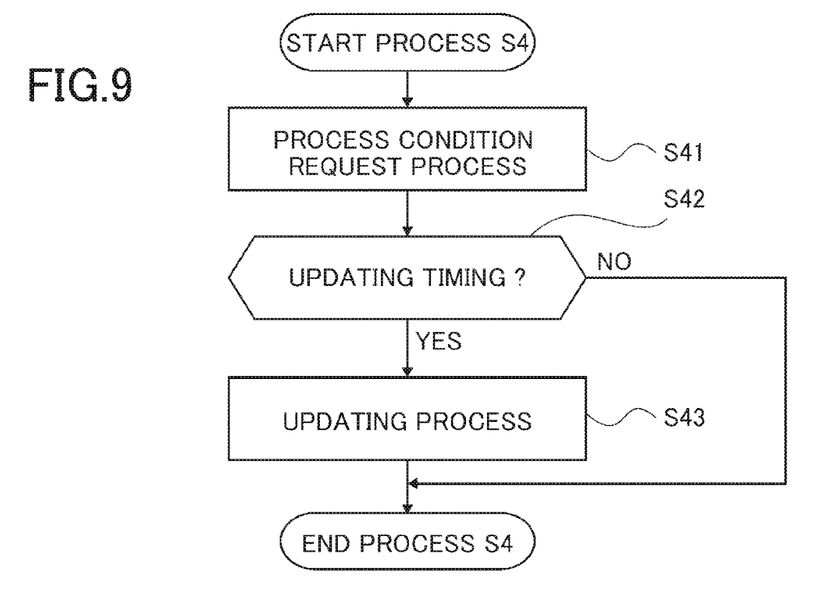
FIG. 9 is a flowchart illustrating an example of flow of a detailed process in a part of the program.

The detailed flow of the updating timing determination process (S4) will be described with reference to the flowchart in FIG. 9.

For example, the vehicle control system 300 appropriately keeps updating the process condition information as the information showing the own process condition. The updated process condition information is stored in the controller 301 of the vehicle control system 300.

At first, the updater 104 of the stereo camera 10 executes a process condition request process (S41). In the process condition request process (S41), the updater 104 outputs a request for obtaining the recognition flag R to the recognizer 108. The updater 104 thereby obtains the value of the recognition flag R from the recognizer 108. The updater 104 determines whether or not the obtained recognition flag R has the pixel group having the recognition flag R of 1 (S42).

When the recognition flag R has the pixel group having the recognition flag R of 1, the tracking process is executed to the pixel group by the tracker 109. Namely, the process of referring the subject in the photographed image 111 is executed. In this case, if the correction parameter 112 is updated by the updater 104, an error occurs to the tracking process of the target corresponding to the pixel group having the recognition flag R of 1. For this reason, the updating timing is not determined when the pixel group having the recognition flag R of 1 is obtained (No in S42), and the updating timing determination process is completed without executing the updating process (S43).

On the other hand, when the pixel group having the recognition flag R of 1 is not obtained, namely, the pixel group having the recognition flag R of 0 is obtained, the tracking process is not executed by the tracker 109. In this case, even when the correction parameter 112 is updated by the updater 104, the error to the tracking process does not occur. When the pixel group having the recognition flag R of 0 is obtained, the updating timing is determined (Yes in S42), and the updating process of the correction parameter 112 is executed (S43).

The updating process (S43) is a process of overwriting and updating the correction parameter 112 previously generated and stored in the RAM based on the correction parameter 112 generated in the correction parameter generation process (S3). After the updating timing determination process (S4), the corrector 106 executes the correction process (S5). The correction process (S5) is a process of generating the corrected image 114 based on the photographed image 111 using the correction parameter 112. The correction parameter 112 for use in this process is the correction parameter 112 which has not been updated or the updated correction parameter 112 in the above updating timing determination process (S4).

In the above description, the process of using the recognition flag R for determining the updating timing is described. However the flow of the process of the program according to the present embodiment is not limited to the above. For example, the condition determination process may be executed between the process condition request process (S41) and the updating timing determination process (S42). The condition determination process is a process of determining whether or not the process in execution in the vehicle control system 300 is a specified process. If the vehicle control system 300 executes the specified process, the updating process (S43) is not executed. In addition, the specified process includes, for example, the recognition process of recognizing an obstacle and the tracking process of tracking an obstacle in the vehicle control system 300.

While the vehicle control system 300 executes the exampled process (No in S42) the correction parameter 112 is updated, the false recognition of the obstacle may occur. The updater 104 completes the updating timing determination process (S4) without executing the updating process (S43).

On the other hand, if the process in execution in the vehicle control system 300 is not the specified process (Yes in S42), the updater 104 executes the updating process (S43). The updater 104 completes the updating timing determination process (S4) after executing the updating process (S43).

The process condition may be voluntarily and appropriately informed in a repeated manner regardless of the request from the updater 104. In this case, the updater 104 executes the updating tithing determination process based on the previously informed process condition (S42) without executing the process condition request process (S41).

As described above, according to the stereo camera 10, when correcting the deviation of the coordinate of the photographed image 111, the updating timing of the correction parameter 112 is controlled according to the determination result such as the recognition or the tracking of the obstacle by the vehicle control system 300.

While the vehicle control system 300 recognizes the obstacle or tracks the obstacle, namely, in the obstacle recognition condition, the vehicle control system 300 generates the corrected image 114 by using the already generated correction parameter 112 without updating the correction parameter 112. While the vehicle control system 300 is not under the obstacle recognition condition, namely, in the non-recognition condition, the vehicle control system 300 updates the correction parameter 112, and generates the corrected image 114 by using the updated correction parameter 112.

According to the stereo camera 10 of the present embodiment, the deviation of the coordinate is corrected, and the distance is accurately calculated without occurring the false recognition in the vehicle control system 300 using the parallax image 115 generated based on the corrected image 114.

Next, another example of the flow of the process of the program that is executed in the stereo camera 10 according to the embodiment will be described. In addition, the same reference numbers are applied to the same processes described above, and the description thereof will be omitted.

Figure 10:
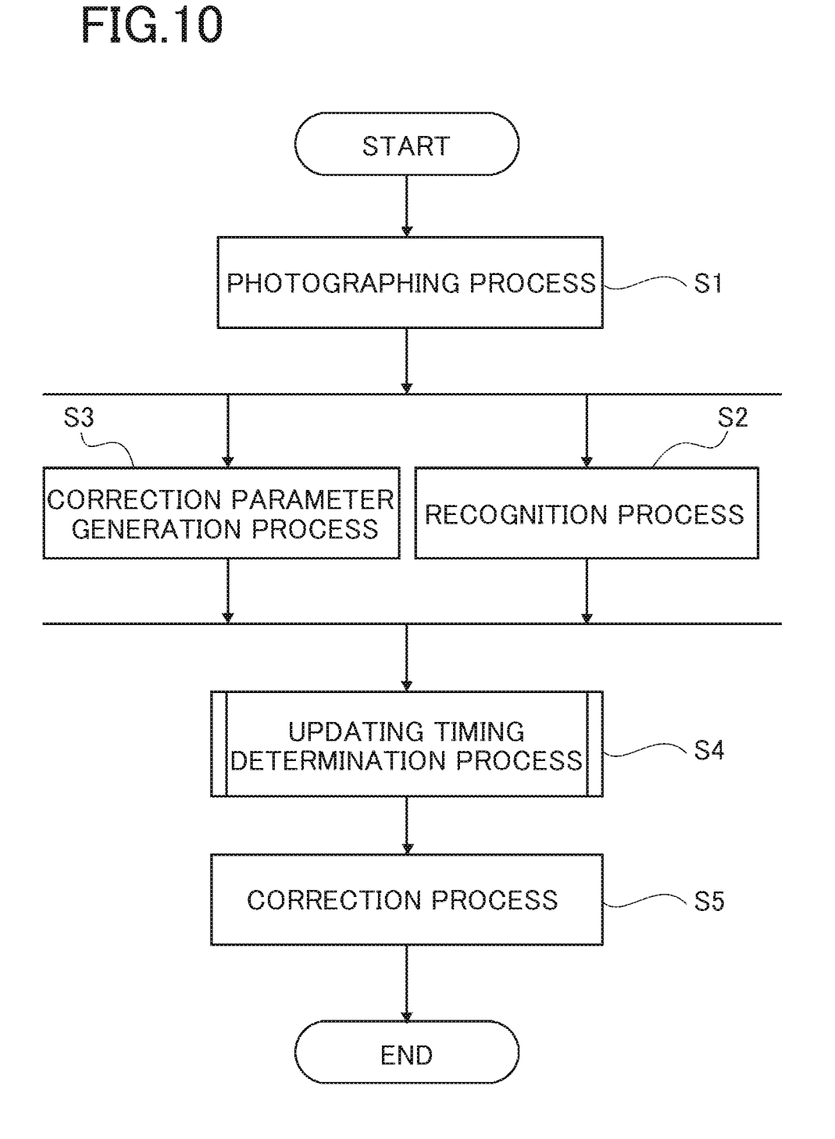
FIG. 10 is a flowchart illustrating another example of flow of a detailed process in a part of the program.

As shown in FIG. 10, in the program according to the present embodiment, the recognition process (S2) and the correction parameter generation process (S3) are executed in parallel. In this case, the stereo camera 10 includes two control units 3 and also a hardware source which achieves a parallel process. By executing the recognition process (S2) and the correction parameter generation process (S3) in parallel, the process speed in the program can be improved.

As shown in the flowchart in FIG. 10, after the photographing process (S1), the recognition process (S2) and the correction parameter generation process (S3) are executed in parallel. In this case, the recognition process (S2) is always executed before the updating timing determination process (S4). In the updating timing determination process (S4), the recognition flag R that is generated by the recognition process (S2) is used. For this reason, if the recognition process (S2) is executed after the updating timing determination process (S3), the false recognition occurs in the vehicle control system 300 using the parallax image 115 generated based on the corrected image 114. As described above, by executing the recognition process (S2) before the updating timing determination process (S4), and executing the correction parameter generation process (S3) and the recognition process (S2) in parallel, the deviation of the coordinate is corrected, and the distance can be accurately calculated at high speed.

As described above, in the program that is executed in the stereo camera 10 according to the present embodiment, the updating process (S43) of the correction parameter 112 may not be generated depending on a condition. The correction parameter 112 is deleted when the power source of the stereo camera 10 is turned off. In this case, the most suitable correction parameter 112 is not obtained when the power source of the stereo camera 10 is turned on. If the correction process (S5) of generating the corrected image 114 is executed with this correction parameter 112, the corrected image 114 including an error may be generated.

The correction parameter 112 may be regularly written in the ROM at timing in which the correction parameter 112 is generated regardless of the updating process (S43) of the correction parameter 112. In this case, the correction parameter 112 in which the updating process (S43) is not executed is determined when the power source is turned on to execute the updating process (S43).

It is not necessary to regularly write the correction parameter 112 into the ROM. A writing process of the correction parameter 112 into the ROM may be executed when the updating process (S43) is not executed for a predetermined time or more, for example.

Figure 11:
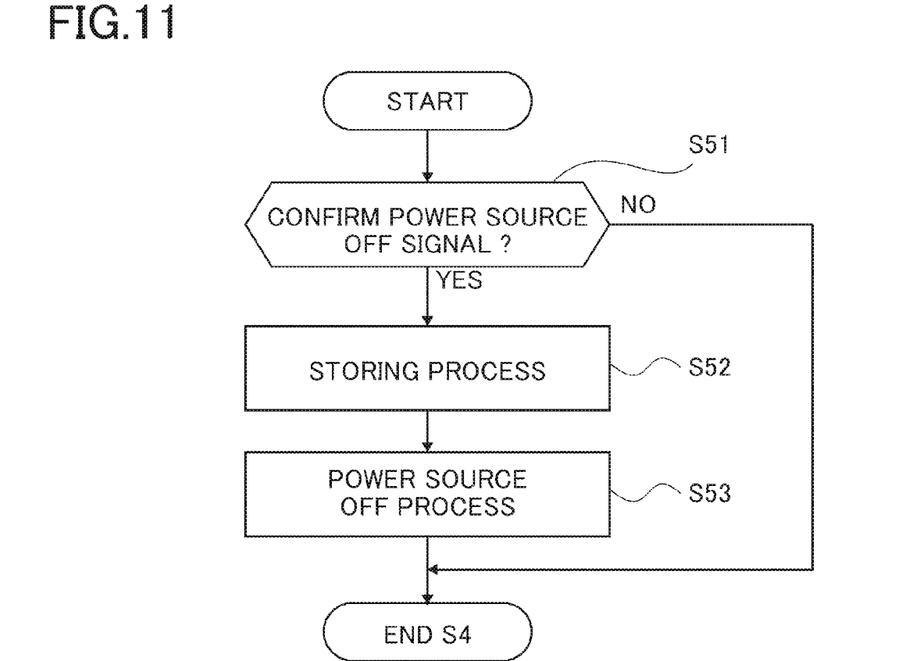
FIG. 11 is a flowchart illustrating another example of flow of a detailed process in a part of the program.

The processes shown in the flowchart of FIG. 11 may be executed. When the updater 104 (refer to FIG. 6) confirms a signal of power source off (Yes in S51), a power source off process is executed (S53) after executing the writing process of the correction parameter 112 into the ROM. The correction parameter can be thereby used when the power source is turned on next.

Figure 12:
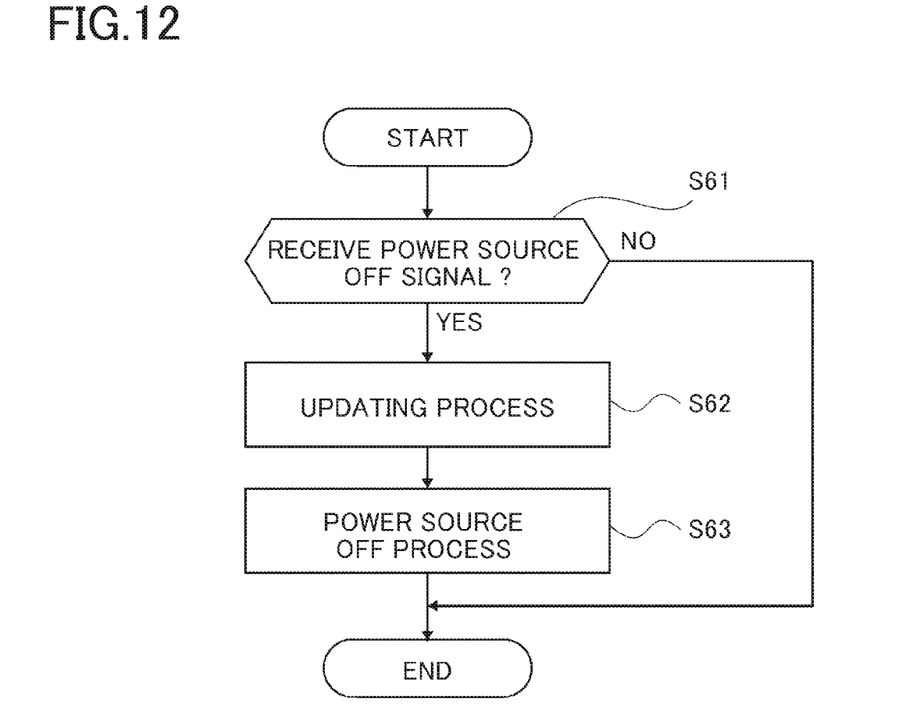
FIG. 12 is a flowchart illustrating another example of flow of a detailed process in a part of the program.

The processes shown in the flowchart of FIG. 12 play be executed. When the updater 104 (refer to FIG. 6) confirms the signal of power source off (Yes in S61), the power source off process is executed (S53) after executing the updating process of the correction parameter 112 (S62). When the power source is tuned on next, the latest correction parameter 112 can be always used.

In addition, the stereo camera 10 of the present embodiment can be used for another system addition to the vehicle control system.

According to the present embodiment, the deviation of the coordinate in the photographed image can be corrected at appropriate timing.

Although the present invention has been described in ter s of exemplary embodiment, it is not limited thereto. It should be appreciated that variations or modifications may be made in the embodiment described by persons skilled in the art without departing from the scope of the present invention as defined by the following claims.

What is claimed is:

1. An image processor comprising:
circuitry that is coupled to a memory and that
corrects deviation of a coordinate in an image photographed by a camera based on a correction parameter stored in the memory to the coordinate, the camera being disposed on a vehicle to identify obstacles to be avoided in a path of the vehicle;
generates the correction parameter based on the image photographed by the camera;
updates the correction parameter stored in the memory when a subject is not recognized in the image; and
does not update the correction parameter when the subject is recognized in the image.

2. The image processor according to claim 1, wherein the memory includes a volatile memory and a non-volatile memory, and
the circuitry updates the correction parameter stored in the volatile memory by the generated correction parameter or regularly stores the generated correction parameter in the non-volatile memory.

3. The image processor according to claim 1, wherein the memory includes a volatile memory and a non-volatile memory, and
the circuitry updates the correction parameter stored in the volatile memory by the generated correction parameter or stores the generated correction parameter in the non-volatile memory when the correction parameter stored in the volatile memory is not updated for a predetermined period by the generated correction parameter.

4. The image processor according to claim 1, wherein the memory includes a volatile memory and a non-volatile memory, and
the circuitry updates the correction parameter stored in the volatile memory by the generated correction parameter or stores the generated correction parameter in the non-volatile memory when a signal for stopping update of the correction parameter is received.

5. The image processor according to claim 1, wherein
the memory includes a volatile memory and a non-volatile memory, and
the circuitry updates the correction parameter stored in the volatile memory by the generated correction parameter or updates the correction parameter stored in the non-volatile memory when a signal for stopping update of the correction parameter is received.

6. The image processor according to claim 1, wherein the circuitry further:
recognizes a target in the image photographed by the camera; and
tracks the target, wherein
the circuitry does not update the correction parameter when tracking the target.

7. A photographing device comprising:
the image processor according to claim 1; and
the camera that photographs an image of a target.

8. The photographing device according to claim 7, wherein
the camera includes at least two cameras, and
the circuitry further calculates a parallax in the target after correcting the image of the target photographed by each of the at least two cameras based on the corrected image.

9. A non-transitory computer-readable computer medium storing computer-readable instructions that, when executed by a processor, cause the processor to perform a method according to claim 1.

10. An apparatus control system comprising:
the photographing device according to claim 7; and
a controller that controls an operation of an apparatus based on information obtained by the photographing device.

11. An apparatus comprising the apparatus control system according to claim 10.

* * * * *